April 1, 1941.  J. L. GILMORE  2,237,031
TRAILER HITCH
Filed Sept. 18, 1939
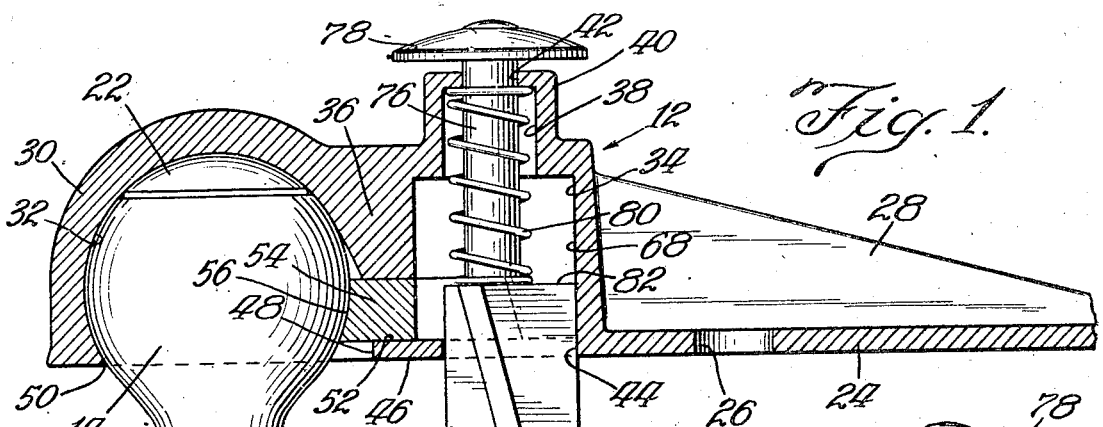
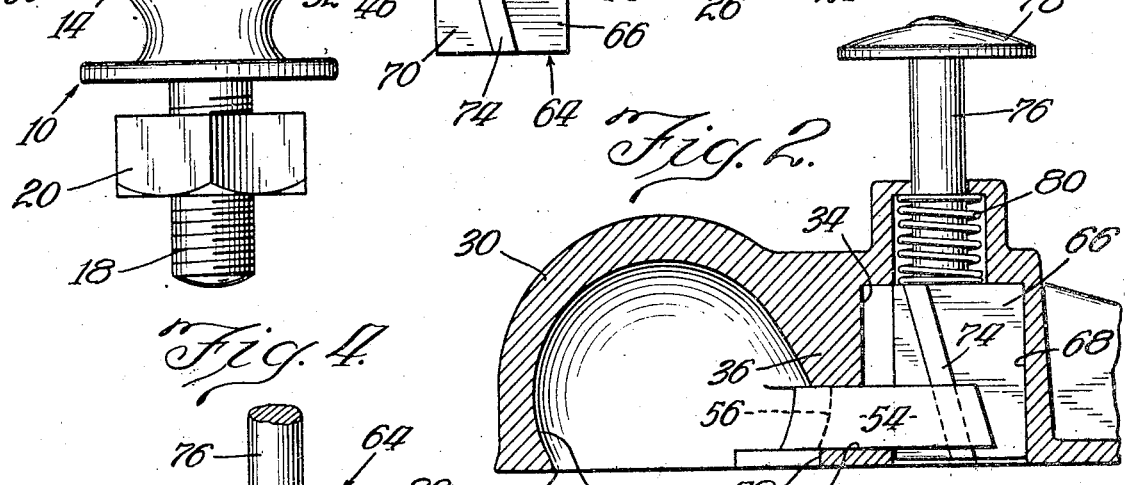
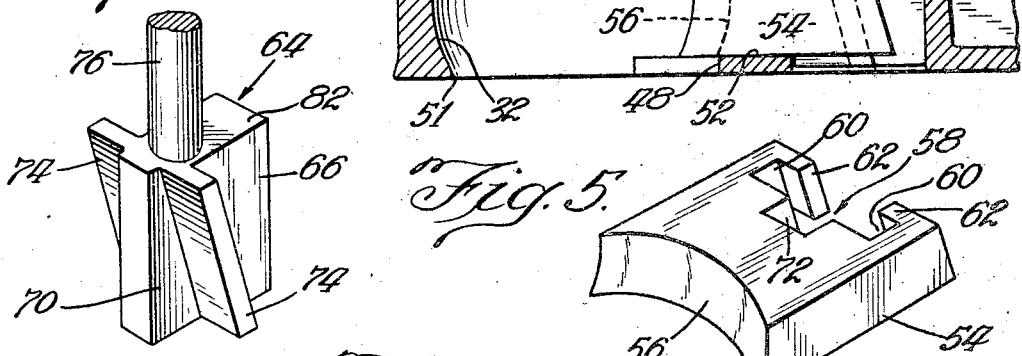
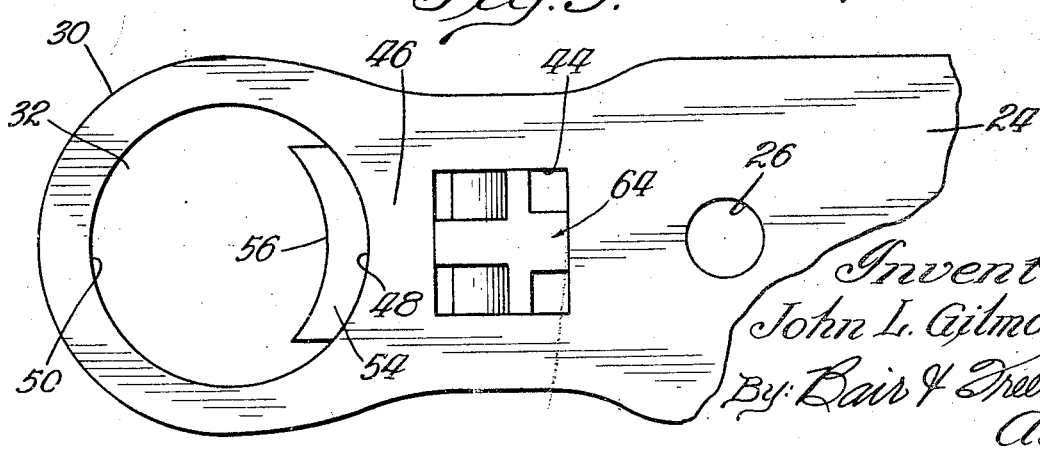
Inventor:
John L. Gilmore
By: Bair & Freeman
Attys.

Patented Apr. 1, 1941

2,237,031

UNITED STATES PATENT OFFICE 2,237,031

TRAILER HITCH

John L. Gilmore, Kansas City, Mo.

Application September 18, 1939, Serial No. 295,481

7 Claims. (Cl. 280—33.17)

My invention relates to couplings for coupling together vehicles and finds particular use in coupling vehicles such as trailers to an automobile.

Among the objects of my invention is the provision of a new and improved trailer hitch which is simple in design and relatively inexpensive to manufacture.

Another object of my invention is the provision of a new and improved trailer hitch wherein a mechanism is provided capable of automatically locking the coupling parts together after they have been brought into coupling engagement.

Still another object is the provision of a new and improved trailer hitch wherein the relative movement of the parts making up the locking device are counted upon to supply a locking relationship once the coupling has been assembled and which are made in such a manner as to be easily disengaged by hand.

A further object of my invention is the provision of a new and improved trailer hitch of such a simple design that it will minimize accidents by reason of the fact that a positive manual adjustment of the parts is necessary in order to place the parts in coupling relationship and which is so operative that it becomes firmly and permanently locked after engagement without the necessity of any further manual manipulation.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a longitudinal sectional view of my device shown with the parts in coupled relationship.

Figure 2 is a fragmentary view showing a longitudinal section through the coupling portion of the shell.

Figure 3 is a fragmentary bottom view of the shell portion shown in Figure 2.

Figure 4 is a perspective view of one of the locking members; and

Figure 5 is a perspective view of another of the locking members.

In the design of trailer hitches and especially those that are to be used for coupling light trailers to automobiles extreme simplicity of design is requisite. Furthermore, since the couplings are widely used by all sorts of persons not thoroughly familiar with mechanical devices they must be made in such a manner that the operation is always positive. By this is meant that the coupling once assembled must stay locked in an assembled position regardless of how forgetful the operator may be or how careless he may be in making certain that the parts are properly coupled.

In the embodiment chosen to illustrate the principle of my invention there is provided a male coupling member indicated by the character 10 and a female coupling member indicated by the character 12. The male member may ordinarily be made with a ball 14 and flange 16 which is supported by a bolt 18 designed for attachment to a vehicle and held in place by means of a nut 20. The bolt is customarily provided with a round head 22 forming part of the ball.

A female member of the coupling commonly termed the shell is provided with a yoke 24 having holes 26 for securing it to the draw bar of a vehicle and a flange 28 to reinforce this portion of the device.

At the opposite end the shell is provided with a rounded portion 30 hollowed out so as to provide a rounded recess or socket 32 for reception of the ball 14 of the male member. Between the recess 32 and the yoke 24 is a second recess 34 which extends more or less in a vertical direction and which is separated from the recess 32 by a wall 36 normally forming a part of the shell. The size of the wall 36 depends somewhat upon the particular proportions of the parts and in some cases the wall may be so small that the recesses 32 and 34 form portions of a single large recess. Above the recess 34 is a smaller cavity 38 formed within a boss 40 on the top of the shell. At the top the boss 40 is pierced by an aperture 42. At the bottom of the shell there is likewise an aperture 44 giving access to the recess 34 and on the bottom between the recesses 32 and 34 is a bridge-like structure 46.

It will be noted that the width of the bridge 46 is narrow at the central point 48 so that the space between it and an opposite point 50 on the front side of the shell is greater than the diameter of the ball 14. The excess width is to permit the ball to be inserted freely into the recess 32.

Joining the recesses 32 and 34 is a passage 52 so constructed that it forms a sliding way or track for a locking block 54. As shown in detail in Figure 5, the locking block is a substantially flat element slidable horizontally within the passage 52 and curved on the front side 56 so as to correspond roughly to the curvature of the surface of the ball 14 at a point slightly below the center line, as viewed in Figure 1.

At the rear of the block 54 there is provided a recess 58 having roughly the shape of a hollow cross with pockets 60 on either side, partly formed by and enclosed by adjacent lips 62 at the rear of the block.

Engageable with the block 54 is a locking member here designated as a shaft 64 and shown in perspective in Figure 4. The shaft as shown is roughly cross-like in cross section so that it can be received into the recess 58 of the block 54. When so positioned a central portion 66 slightly smaller than the space between the lips 62 of the recess is positioned therein, and extends beyond the rear face of the block so that when assembled it can slide along a rear face 68 of the recess 34. Opposite the central portion 66 a forward portion 70 of the shaft is made to slide freely within a forward portion 72 of the recess 58.

On each side of the shaft there is provided an oblique flange 74 positioned in a direction to form a rather obtuse angle with relation to the horizontal axis of the block 54. The flanges 74 are made of such a size as to freely slide within the pockets 60 of the recess 58. It should be further noted that the arms of the recess are pitched at the same obtuse angle as the pitch of the flanges 74 when the block 54 is in horizontal position.

On the top side the shaft is provided with a bolt-like projection 76 which extends upward in assembled position as viewed in Figure 1 through the aperture 42 in the top of the boss 40. A knob 78 is attached to the top of the bolt for convenience in gripping and also for preventing the bolt from sliding downward out of place.

There is provided in addition a coiled spring 80 forming a resilient member surrounding the bolt 76 and engaging the top wall of the cavity 38 at the top and an upper face 82 of the shaft 64.

*Operation*

When the parts of the shell member are assembled as shown in Figure 2 and it is desired to couple the shell to the male member, the operator grasps the knob 78 and pulls it upwards against the tension of the coiled spring 80 thus drawing the shaft 66 in an upward direction. As the shaft 66 is drawn upward the flanges 74 slide within the recess 58 of the locking block 54 and force the locking block rearward away from the recess 32 by contact of the flanges against the lips 62 at the rear of the locking block. The coupling is so designed that when the bolt 66 is in its uppermost position the curved front face 56 of the block is withdrawn to a point adjacent the front edge 48 of the bridge 46 making a hole wide enough to permit insertion of the ball 14.

Once the ball has been inserted the operator merely releases the knob 78 and a shaft is forced downward by means of the coiled spring 80 to the position shown in Figure 1. As the shaft moves downward the front faces of the flanges 74 press against the front walls of the pockets 60 of the recess 58 and force the locking block 54 in a forward direction. A forward movement of the block is made such that the curved front face is pressed into contact with the ball 14 at a point somewhat below the center line of the ball. When the parts have been thus automatically coupled the ball and shell are held firmly in engagement. When there is any tendency for the ball to pull out from the recess or socket there will always be a tendency to slide the block 54 in a horizontal rearward direction. Due to the fact, however, that the angle between the longitudinal horizontal axis of the block 54 and the axis of the oblique flanges 74 is relatively obtuse, frictional force between the faces is so great that there is no movement of the shaft 66 upward against the tension of the spring 80. Therefore, once assembled the coupling members remain firmly and automatically locked together and cannot be separated from one another except by manually pulling the shaft 66 upward by a grip upon the knob 78.

There has thus been provided a coupling of simple design having a very limited number of parts and one which is semi-automatic in operation sufficiently to insure safe conditions whenever in use.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A trailer hitch comprising a male coupling member, a shell having a socket for the retention of said male member, a horizontally reciprocable block in the socket adapted to be urged into contact with the male member for holding it in place, and a shaft having a sliding mounting in the shell reciprocable at an angle to the horizontal having a displacement member engageable alternately on opposite sides thereof with the block for shifting said block back and forth, resilient means positioned independently of said block normally tending to shift the shaft and block to a position for engagement with the male member and a handle for drawing said shaft accompanied by said block to a position releasing said male member.

2. A trailer hitch comprising a male coupling member, a shell having a socket for the retention of said male member, a horizontally reciprocable block in the socket adapted to be urged into contact with the male member for holding it in place, said block having a channel therein positioned with the longitudinal axis of the channel tilted at an oblique angle from a vertical position and a vertically reciprocable shaft including an element positioned with the longitudinal axis thereof parallel to the axis of said channel having a sliding wedge engagement with the block at opposite sides of said channel for shifting said block back and forth, resilient means normally tending to shift the shaft and block to a position for engagement with the male member and a handle extendable axially relative to the shaft for drawing said shaft and block to a position releasing said male member.

3. A trailer hitch comprising a ball-like male member, a shell cooperable with the male member and a locking block means for locking the parts in coupled relation, said shell having a recess therein, one portion of said recess being rounded for reception and retention of the ball-like member and a second portion of said recess extending laterally therefrom, means for securing the ball-like member in the first recess portion comprising a reciprocating block having one end rounded for engagement with the ball-like member, a horizontal track for the block extending from the first recess portion to the second recess portion, a substantially vertically shifting element including a wedge shaped portion engageable with the block, one face of said vertically shifting element having sliding contact with one wall of said second recess portion and another face having contact with an opposite wall of said last recess portion, and means for shifting the securing means to allow admission and removal of the ball-like member to and from said first portion of the recess.

4. A trailer hitch comprising a ball-like male member, a shell cooperable with the male member and a locking block means for locking the parts in coupled relation, said shell having a pair of recesses therein, one of said recesses being rounded for reception and retention of the ball-like member and the other of said recesses being separated from the first by an interior wall, means for securing the ball-like member in the first recess portion comprising a reciprocating block having one end rounded for engagement with the ball-like member below the central diameter thereof, a horizontal track for the block extending through the wall from the first recess portion to the second recess portion, a vertically reciprocating element including a wedge shaped portion mounted in the second recess engageable with the block, opposite faces of said vertically shifting element having sliding contact with opposite walls of said second recess, and means on said last element for shifting the securing means to allow admission and removal of the ball-like member to and from said first recess.

5. In a trailer hitch, a ball-like male member, a shell for holding the male member and a locking block means for locking the parts together, said shell having a recess therein, one portion of said recess being rounded for reception and retention of the ball-like member and a second portion of said recess extending laterally therefrom and separated therefrom by a section of the shell, means for securing the ball-like member in the first portion comprising a reciprocating block having one end rounded for engagement with the ball-like member below the center line thereof, a horizontal track for the block extending from the first portion to the second portion of the recess, a substantially vertically shifting element including a wedge shaped portion having a sliding engagement with the block, and an upper portion adapted when withdrawn to engage the top of said second portion of said recess, a face thereof having sliding contact with a wall of said second recess portion, a reciprocating stem projecting through the shell, a handle on the stem, and a resilient means concealed in said second recess portion engaging the stem operable normally to shift said vertically shifting element to a wedging position for extending the block into locked position, said element being retractable manually to provide withdrawal of the block to allow admission and removal of the ball-like member to and from said first portion of the recess.

6. A trailer hitch comprising a male coupling member, a shell having a recess for the retention of said male member, and locking means for securing the male member in the socket, said locking means including a substantially horizontally reciprocable block adapted to be advanced into engagement with the male member and withdrawn therefrom, a horizontal track for the block, said block being shaped on one end to engage the male member and having a recess in the other end with overlapping lips, a substantially vertically reciprocable shaft having an inclined flange slidably held within the recess of the block adapted to have one face thereof positioned for engagement against the block to force it into locking position and another face positioned for engagement with the lip for shifting said block out of locked position.

7. A trailer hitch comprising a male coupling member, a shell having a recess for retention of said male member and a locking means for securing the male member in the recess, said locking means including a substantially reciprocable block adapted to be advanced into engagement with the male member and withdrawn therefrom, a track for the block, said block having oppositely disposed faces thereon facing respectively toward and away from the male member and located at the end of the block away from said male member, a reciprocable shaft member, an inclined surface on said shaft member having a transverse slidable engagement with one of said oppositely disposed faces for shifting said block into an engaged position with the male member and another inclined surface on said shaft member having a transverse slidable engagement with the other of said oppositely disposed faces for shifting said block into a position released from the male member, said shaft member having a sliding engagement with the shell at a location opposite from the point of engagement of said block with said male member.

JOHN L. GILMORE.